(12) United States Patent
Telang et al.

(10) Patent No.: US 11,416,913 B1
(45) Date of Patent: Aug. 16, 2022

(54) E-COMMERCE PROCESSING FOR AN EVENT-CENTRIC ONLINE SHOPPING TRANSACTION

(71) Applicant: Safeway Inc., Pleasanton, CA (US)

(72) Inventors: Andrea Jayne Telang, Pleasanton, CA (US); Troy Adam Darmody, Pleasanton, CA (US)

(73) Assignee: Safeway Inc., Pleasanton, CA (US)

( * ) Notice: Subject to any disclaimer, the term of this patent is extended or adjusted under 35 U.S.C. 154(b) by 0 days.

(21) Appl. No.: 17/195,381

(22) Filed: Mar. 8, 2021

(51) Int. Cl.
| | | |
|---|---|---|
| *G06Q 30/06* | (2012.01) | |
| *G06Q 30/02* | (2012.01) | |
| *G06Q 20/12* | (2012.01) | |
| *G06Q 20/38* | (2012.01) | |

(52) U.S. Cl.
CPC ......... *G06Q 30/0635* (2013.01); *G06Q 20/12* (2013.01); *G06Q 30/0226* (2013.01); *G06Q 20/386* (2020.05)

(58) Field of Classification Search
CPC ............... G06Q 30/0635; G06Q 20/12; G06Q 30/0226; G06Q 20/386

USPC .................................................... 705/14.27
See application file for complete search history.

(56) References Cited

FOREIGN PATENT DOCUMENTS

JP 4402744 B1 * 1/2010

OTHER PUBLICATIONS

Kristen McCabe, Event Marketing: The 10 Best Types of Events, 2018 (Year: 2018).*

* cited by examiner

*Primary Examiner* — Tarek Elchanti
(74) *Attorney, Agent, or Firm* — Conley Rose, P.C.; Rodney B. Carroll

(57) ABSTRACT

Disclosed is e-commerce processing for an event-centric online shopping transaction. The e-commerce processing involves receiving an identification or selection of an event from a device of a customer, and the disclosed methods and systems use the identified and/or selected event to populate, without item-related input from the customer, an online shopping cart with items for purchase in an e-commerce computing environment. The e-commerce processing can be accomplished without any party to the transaction having to add items to the online shopping cart on an item-by-item basis.

20 Claims, 3 Drawing Sheets

E-COMMERCE PROCESSING FOR AN EVENT-CENTRIC ONLINE SHOPPING TRANSACTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The COVID-19 pandemic has caused shifts in consumer behavior in the United States and abroad, including significant growth in the volume of online shopping for foods and other items traditionally found at grocery stores. In the United States, online shopping at websites for grocery stores has been available since before the pandemic. A customer can visit a grocery store website, select goods and items for purchase, select an option for obtaining the purchased items (e.g., curbside pickup or local delivery to a specified location such as a customer's home address or business address), and then purchase the items through an e-commerce payment method.

When selecting goods and items via the website, a customer usually searches for the item using a search tool made available within the website, selects the item, and the adjusts the quantity of the item to the desired quantity. The customer has to do this for each item, which is time consuming and also requires that the customer separately remembers the items needed so that all needed items are searched for and purchased. Some websites have enhanced searching tools such as a tool that suggests alternative items and items that other users also searched for when searching for the same item.

The increased number of customers that interact with a merchant's website since the rise of the pandemic has caused an increase in the need for more efficiently processing online shopping transactions.

SUMMARY

Embodiments of a method and an e-commerce system for processing an event-centric online shopping transaction via an e-commerce website are disclosed.

In the method, the e-commerce website is administered by a website computer, and the method includes presenting, by the website computer to a device of a customer, a first webpage of the e-commerce website, wherein the first webpage contains a list of events; receiving, by the website computer from the device of the customer via the e-commerce website, a selection for an event from the list of events for the event-centric online shopping transaction; receiving, by the website computer from the device of the customer via the e-commerce website, an input for a size of the event; determining, by the website computer, a list of items that are associated with the event; determining, by the website computer, a quantity for each of the items based on the size of the event; and presenting, by the website computer via a second webpage, an online shopping cart containing the list of items and the quantity for each of the items for display on the device of the customer; wherein no interaction is made between the website computer and the device of the customer between the steps of receiving the input for the size of the event and presenting the online shopping cart via the second webpage.

The e-commerce system can include a website computer configured to: administer an e-commerce website; present, to a device of a customer that is networked with the website computer, a first webpage of the e-commerce website, wherein the first webpage contains a list of events; receive, from the device of the customer via the e-commerce website, a selection for an event from the list of events for the event-centric online shopping transaction; receive, from the device of the customer via the e-commerce website, an input for a size of the event; determine a list of items that are associated with the event; determine a quantity for each of the items based on the size of the event; and present, via a second webpage, an online shopping cart containing the list of items and the quantity for each of the items for display on the device of the customer; wherein no interaction is made between the website computer and the device of the customer between the website computer receiving the input for the size of the event and presenting the online shopping cart via the second webpage.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
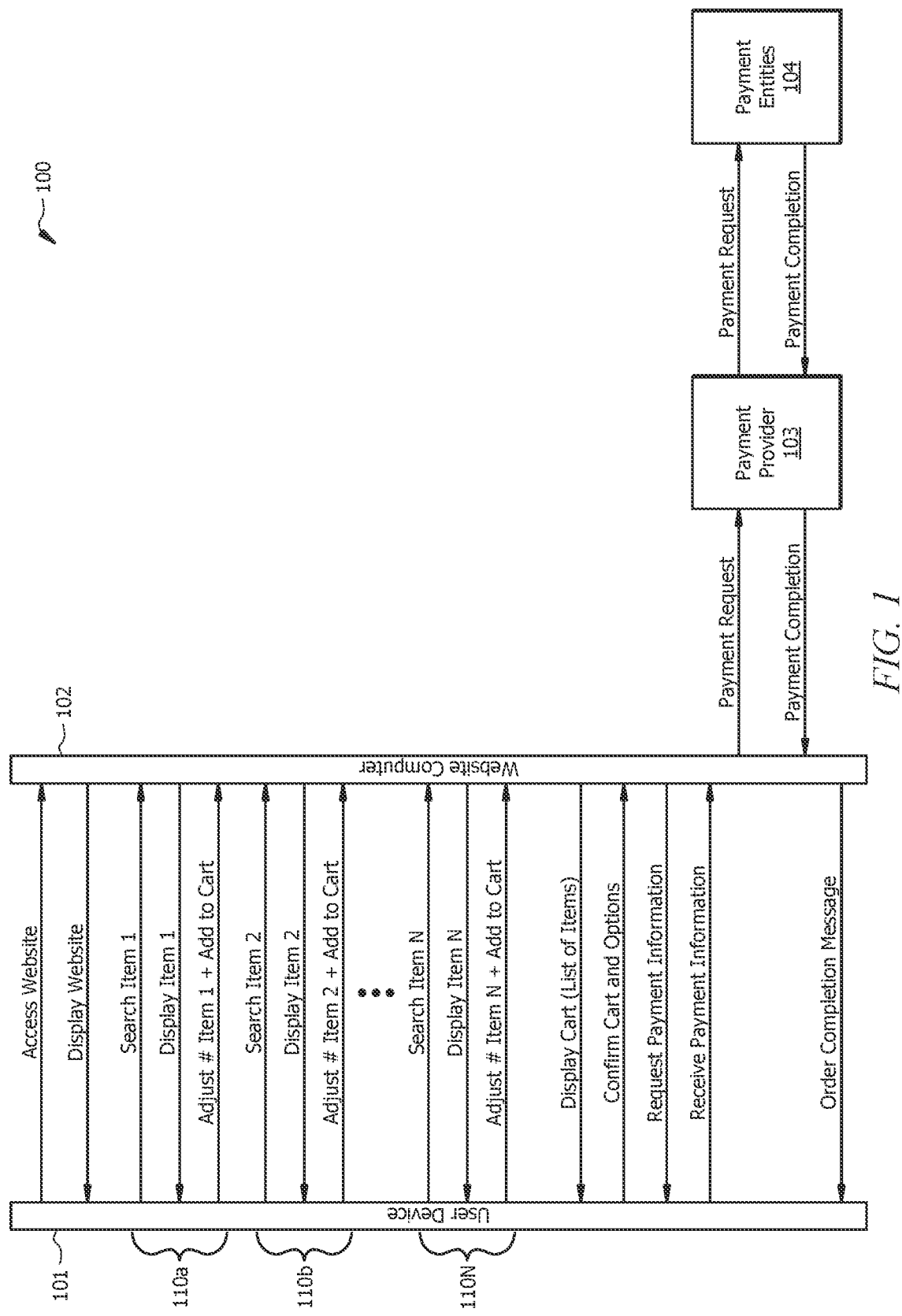
FIG. 1 is a schematic diagram of conventional data flow and computer components for e-commerce processing of an online shopping transaction.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, the term "event" includes any event or occasion for which a person would normally buy items from any department of a merchant grocery store, including the produce, meats and seafood, deli, dairy/egg/cheese, floral, bakery, wine/beer/spirits, and beverage departments. Examples of events can be New Year's meal, Religious Holiday meal, Thanksgiving meal, Valentine's Day meal, St. Patrick's Day celebration, Father's Day meal, Mother's Day meal, Easter meal, Wine Tasting, Birthday Party, Graduation Party, Over the Hill Party, Retirement Party or Dinner, Anniversary Meal, Baby Shower, Sports Watch Party, Girls Night, Guys Night, Wine and Cheese, etc.

As used herein, the term "event-centric online shopping transaction" refers to an online transaction using an e-commerce website and that is processed according to the disclosed methods and systems.

As used herein, the term "item-centric online shopping transaction" refers to an online transaction at an e-commerce website where items are added to an online shopping cart item-by-item, via a search for each item and then an addition of each item to the online shopping cart. This term is used to distinguish transaction processing when a customer uses item-by-item shopping from the processing of event-centric online shopping transactions disclosed herein.

As used herein, the term "item" refers to any good or any service that is offered for sale by a merchant on the merchant's e-commerce website.

As used herein, the term "device of the customer" refers to a mobile phone (e.g., smartphone), tablet, desktop computer, or other device, which has a network connection so that a merchant's e-commerce website can be accessed by and displayed on the device of the customer via the Internet. The "device of the customer" has processing and data storage capability for interacting with the merchant's e-commerce website.

As used herein, the term "payment provider" refers to the hardware and software computing components which function to provide payment processing for computing systems. An example of such a provider includes the payment processing solutions provided by FIRSTDATA®.

As used herein, the term "cloud", "cloud computing system", "cloud-based", and like terms refer to the hardware and software computing components which operate in cloud computing. The definition for "cloud computing" as set forth by the National Institute of Standards and Technology for the U.S. Department of Commerce includes a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Online shopping for items at a merchant's e-commerce website involves placing items in an online shopping cart and then paying for the items in the online shopping cart. For purposes of the discussion herein, online shopping transactions can be considered to have two portions: an item-selection portion and a payment portion. The e-commerce processing disclosed herein improves and shortens the amount of time for the item-selection portion of the transaction, and thus, for the online shopping transaction as a whole.

The disclosed methods and systems for e-commerce processing for event-level online shopping transactions shift item selection when online shopping for an event from the customer to merchant-controlled computers such as the merchant's website computer and loyalty computer. The interaction between the customer and the merchant is changed from an item-level interaction to fill an online shopping cart to an event-level interaction, where the merchant's website computer populates the customer's online shopping cart with items specific for an identified/selected event. The disclosed methods and systems should be contrasted with item suggestion techniques used by online merchants. Item suggestion techniques can suggest items for purchase, such as "items you may like" based on a customer's selection of an item; however, these item suggestion techniques rely on the user first selecting an item. In contrast, the disclosed methods and systems for e-commerce processing for event-level online shopping transactions shift item selection when online shopping for an event from the customer to merchant-controlled computers by populating the customer's online shopping cart with items specific for an identified/selected event. It is contemplated that the disclosed methods and systems can be used in combination with item suggestion techniques after items are populated in the customer's online shopping cart.

By shifting item selection from the customer to the merchant, the time it takes to process the item selection portion of online shopping transactions with the merchant is significantly reduced. The methods disclosed herein decrease transaction time for event-centric online shopping transactions because the search for event-related items is shifted from the customer to the merchant's computer system (e.g., a website computer and in some aspects, additionally a loyalty, and in some additional aspects, a central tracking computer). Item-by-item search for items by a customer is transformed to smart event-level communications in which event-centric items are proposed to the customer by the website computer disclosed herein. The work shifting, in effect, identifies items critical to the customer's online transaction, in that, items that are not specifically needed for an identified or selected event are not searched by the customer's device and by the merchant computers, improving the transaction speed of the merchant's computers because a more limited item data set is searched since the search is limited to items specific to the identified and/or selected event.

In some aspects, the time to complete the item-selection portion of the event-centric online shopping transaction of the disclosed methods and system can be less than 60%, 59%, 58%, 57%, 56%, 55%, 54%, 53%, 52%, 51%, 50%, 45%, 40%, 35%, 30%, 25%, 20%, 15%, 10%, or 5% of the time to complete the item-selection portion of the item-centric online shopping transaction which utilizes an item-by-item search to fill an online shopping cart. For example, for an event having ten items, a customer can typically spend from 10-30 seconds per item using the conventional method disclosed herein to search for add items to the online shopping cart, taking a total time of 100-300 seconds for the item selection portion of the transaction. In method 200 of FIG. 2, the item selection portion of the transaction is shifted to an event level inquiry, with pre-selected items unique to the selected event delivered by the website computer 202 to the device 101, possibly decreasing the item selection portion of the transaction to 30-60 seconds (only 60% to as low as 10% of the time it takes for item-by-item processing), since the website computer 202 determines and searches for the items associated with the selected event. In method 300 of FIG. 3, communication of the website computer 302 with the loyalty computer 303 further accelerates the item selection portion of the transaction, especially for events that are previously stored by the system, possibly decreasing the item selection portion of the transaction to 10-30 seconds (only 30% to as low as 3.3% of the time it takes for item-by-item processing), since the website computer 302 and loyalty computer 303 can determine items specific to an event and specific to the loyalty account (i.e., specific to the customer's previously purchased items for the same or similar event).

The faster transaction speed and reduced data load on the merchant's computers also result in a reduced amount of time a customer spends shopping online for the event, which enhances the customer experience and builds loyalty to the merchant.

For clarity, the conventional method 100 and disclosed methods 200 and 300 will be described using a scenario where a single customer shops at an online e-commerce website of a grocery store for items that are commonly needed for a single birthday party for ten people. However, it should be understood that the methods can simultaneously handle large numbers of customer interactions for online shopping administered by a merchant. Also, it should be understood that the computer components used to implement the methods 200 and 300 disclosed herein are parts of the computer systems function to implement the methods 200 and 300. As such, the following discussion of the methods 200 and 300 is simultaneously a description of the computer systems disclosed herein.

A conventional method 100 for customers to shop for items needed for an event is shown in FIG. 1. The event used to describe the method 100, when appropriate, is a single birthday party for ten people.

The computer system components that have functionality to perform the method 100 include a device 101 of the customer, a website computer 102, a payment provider 103, and payment entities 104. The components of the computer system are linked or networked with at least one other component to accomplish the communications shown in FIG. 1: the device 101 is networked with the website computer 102; the website computer 102 is additionally networked with the payment provider 103; and the payment provider 103 is additionally networked with the payment entities 104.

Each of the computer system components 102, 103, and 104 can be embodied with computer equipment such as one or more processors, memory, networking cards, and other equipment for processing data (e.g., sending/receiving messages containing data) associated with online shopping at a merchant's e-commerce website. Moreover, any combination of computer system components 102, 103, and 104 can be embodied in whole or in part as a cloud computing system.

The device 101 of the customer is configured to access the merchant's website via an Internet connection and allow the customer to provide input for online purchases of items at the merchant's website. The website computer 102 is configured to host the merchant's website and to communicate with the device 101 and payment provider 103 as described herein. The website is configured as an online e-commerce shopping platform in which customers can access and interact, via the device 101, in order to purchase items normally purchased at a brick and mortar location for a merchant. The payment provider 103 is configured to provide payment processing for the merchant's website. The payment entities 104 are typical entities having equipment and payment networks for processing payment transactions (e.g., computer equipment of an acquiring bank, issuing bank, processing entity, a VISA® payment processing network, for example).

Labeled arrows are used to describe the method 100 in FIG. 1. The "Access Website" arrow indicates that the method 100 can begin with the user accessing the merchant's website via the device 101. Typically, the user types in the URL address of the merchant's website in an Internet browser (e.g., Chrome, Firefox, Internet Explorer, Safari, or any other browser), causing the device 101 to find the merchant's website on the Internet and display (the "Display Website" arrow) a designated page of the merchant's website on the device 101 that is received from the website computer 102.

The conventional method 100 can then proceed with the customer using the device 101 to search for items needed for the birthday party having ten people. The customer uses the device 101 to search for, select, and adjust the number of each item needed for the birthday party, in indicated in FIG. 1 as item-by-item selection steps 110a, 110b, and 110N.

In item selection step 110a, the inquiry from the device 101 to the website computer 102 for "Search Item 1" might be for a birthday cake. The customer can enter "birthday cake" in a search box of the website displayed on the screen of the device 101, then press "go" so that the website computer 102 can analyze the inquire and display a list of birthday cakes to the device 101 (arrow "Display Item 1"). The customer can then use the device 101 to review a list of one or more birthday cakes available for purchase, select the desired birthday cake, and then adjust the number of birthday cakes needed for the ten people that will attend the birthday party. The customer can then use the device 101 to add (e.g., an "add to cart" button) the selected birthday cake to the online shopping cart. The website computer 102 can then temporarily save the selected birthday cake in the online shopping cart while the customer continues to search for additional items.

In item selection step 110b, the inquiry from the device 101 to the website computer 102 for "Search Item 2" might be for balloons. The customer can enter "balloons" in a search box of the website displayed on the screen of the device 101, then press "go" so that the website computer 102 can analyze the inquire and display a list of balloons to the device 101 (arrow "Display Item 2"). The customer can then use the device 101 to review a list of balloons available for purchase, select the desired balloons, and then adjust the number of each balloon needed for the birthday party. The customer can then use the device 101 to add (e.g., an "add to cart" button) the selected balloons to the online shopping cart. The website computer 102 can then temporarily save the selected balloons in the online shopping cart while the customer continues to search for additional items.

This search, display, and selection is repeated for each item needed (candles, cups, plates, utensils, party hats, napkins, table covering, flowers, beverages, etc.) until all N items have been searched and added to the online cart, i.e., shopping step 110N is completed.

In the arrow "Display Cart (List of Items)", the website computer 102 can present the device 101 with a webpage that lists the items in the online shopping cart. The displayed webpage can include options to obtain the items, such as curbside pickup, in-store pickup, or delivery. In arrow "Confirm Cart and Options", the website computer 102 receives a message from the device 101 containing information that the items in the online shopping cart and method of pickup or delivery are confirmed.

In arrow "Request Payment Information", the website computer 102 can present the device 101 with a webpage that requests the customer to enter payment information, such as payment card number, payment card expiration date and any other information a merchant may request to verify and authorize payment for the items in the online shopping cart (e.g., zip code, phone number, payment card code, customer identification number, or a combination thereof). In arrow "Receive Payment Information", the website computer 102 receives any payment information sent from the device 101 to the website computer 102.

Upon receiving payment information from the device 101, arrow "Payment Request" indicates that the website computer 102 can send a payment request message to the payment provider 103. Arrow "Payment Request" between the payment provider 103 and the payment entities indicates that the payment provider 103 can then send a payment request message to the appropriate payment entity of the payment entities 104, for payment from the customer's payment account (associated with the payment card) to the merchant's account. Arrow "Payment Completion" between the payment entities 104 and the payment provider 103 indicates that the payment entity of the payment entities 104 then sends a payment completion message to the payment provider 103. Arrow "Payment Completion" that is between the payment provider 103 and the website computer 102 indicates that the payment provider 103 then sends a payment completion message to the website computer 102. In response to receiving the payment completion message from the payment provider 103, arrow "Order Completion Message" indicates that the website computer 102 then sends an order completion message (confirming payment) to the device 101, displayable as an order completion webpage on the device 101 for viewing by the customer.

The conventional method 100 thus includes a customer's item-by-item search on the merchant's website for the N items needed for an event. The consumer must use the device 101 to search for, select, and add the number of each item needed for the event. The amount of time that the website computer 102 spends on the online transaction depends mostly on the speed of the customer to interact with the website via the device 101 for the item selection portion of the transaction. A customer can be interrupted during the transaction, or have trouble remembering all the items needed, increasing the time the website computer 102 must interact with the device 101 in order to complete the transaction with the customer. Also, the customer may not realize that some items are available from the merchant and not attempt to search for some items that are needed for the event.

Figure 2:
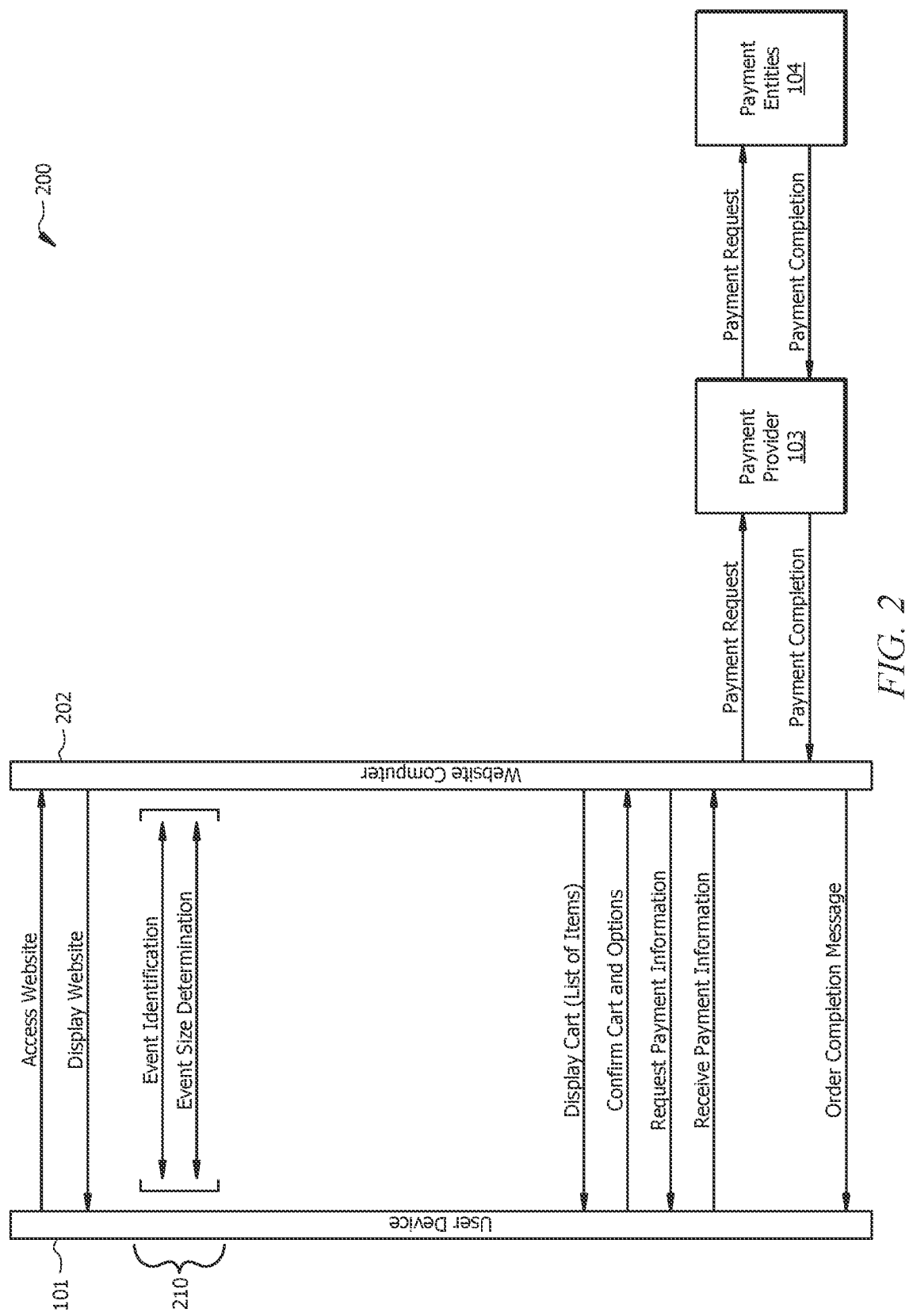
FIG. 2 is a schematic diagram of an embodiment of data flow and computer components used in e-commerce processing for an event-centric online shopping transaction.

The disclosed method 200 for processing an event-centric online shopping transaction is shown in FIG. 2. For purposes of comparison to the method 100 in FIG. 1, the event used to describe the method 200, when appropriate, is a single birthday party, and the size of the event is for ten people.

The computer system components that have functionality to perform the method 200 include the device 101 of the customer, a website computer 202 of a merchant computer system, the payment provider 103, and the payment entities 104. The computer system components are linked or networked with at least one other component to accomplish the communications shown in FIG. 2: the device 101 is networked with the website computer 202; the website computer 202 is additionally networked with the payment provider 103; and the payment provider 103 is additionally networked with the payment entities 104. The network between any two of the computer system components can be via a Wi-Fi communication network, a Bluetooth communication network, a cellular communication network, a mobile communication network, a satellite communication network, an Ethernet communication network, a wired communication network, or a combination thereof.

Each of the computer system components 103, 104, and 202 can be embodied with computer equipment such as one or more processors, memory, networking cards, and other equipment for processing data (e.g., sending/receiving messages containing data) associated with online shopping at a merchant's e-commerce website. Moreover, any combination of computer system components 103, 104, and 202 can be embodied in whole or in part as a cloud computing system.

Labeled arrows are used to describe the method 200 in FIG. 2. The "Access Website" arrow indicates that the method 200 can begin with the website computer 202 receiving a request for the device 101 to access the merchant's website. Typically, the user types in the URL address of the merchant's website in an Internet browser (e.g., Chrome, Firefox, Internet Explorer, Safari, or any other browser), causing the device 101 to find the merchant's website on the Internet. The website computer 202 is configured to send a designated webpage for display (the "Display Website" arrow) of the designated webpage of the merchant's website on the device 101.

Instead of depending on the customer to search for and select items for the desired event, step 210 indicates that the website computer 202 is configured to communicate with the device 101 to 1) identify the event that the customer is shopping for (the "Event Identification" double arrow), and 2) determine the size of the event (the "Event Size Determination" double arrow).

In some aspects, to identify the event, the method 200 can include receiving, by the website computer 202, a search inquiry or selection for an event from the device 101. The search inquiry or selection can be via a webpage the is presented by the website computer 202 and can, in some embodiments, contain a list of events that are selectable by the device 101. The website computer 202 can be configured to then display another webpage inquiring how many people will attend the event, subsequently receiving an input from the device 101 for the number of people for the event. Alternatively, the website computer 202 can have an event landing webpage from which the website computer 202 can receive an event selection and optionally an input of the number of people attending the event from the device 101. In the example of the birthday party, the website computer 202 can receive a search inquiry, input, and/or selection from the landing page for a birthday party. Along with or separately from the inquiry, input, and/or selection, the website computer 202 can receive an input that 10 people will attend the birthday party.

In aspects, the website computer 202 is configured to provide filtering options to the device 101, either in individual webpages or in the event landing webpage, that are selectable to narrow the selected event to a particular event species. For example, for a birthday party, the website computer 202 can provide options to receive information from the device 101 to determine if the birthday party is for a baby, a toddler, a teenager, a young adult, a middle-aged adult, a senior citizen, a male, a female, gender neutral, allergy sensitivities (e.g., nut-free, gluten-free), color blind, deaf, blind, etc.

After step 210, the website computer 202 is configured to determine a list of items that are associated with the event. In aspects, the datastore of or networked with the website computer 202 can be pre-loaded with item lists that associated with events. It is contemplated that a given item may be associated with more than one event; for example, utensils may be associated with any type of party having food; while other items may be unique for a specific event, such as new year's party favors for a New Year's Eve event. For the birthday example, the website computer 202 can be configured to determine that items associated with the birthday party include a birthday cake, candles, balloons, cups, plates, utensils, party hats, napkins, table covering, flowers, beverages, etc. In aspects where the merchant is a grocery store, the list of items can include items from any combination of departments of the grocery store. In some aspects, the website computer 202 can determine the items based on any filtering criteria received from the device 101 after the website computer 202 provides the filtering inquiries.

In the arrow "Display Cart (List of Items)", the website computer 202 can present the device 101 with a webpage that lists the items associated with the event in the online shopping cart and includes the quantity of each item in the list. The displayed online shopping cart webpage can include a button to adjust the suggested quantity for each item in the list. In some aspects, the online shopping cart webpage provided by the website computer 202 can include a button for each item that deletes the item from the online shopping cart, and the website computer 202 can receive a deletion of one or more items from the list from the device 101. In other aspects, the website computer 202 can receive a confirmation that there is no change to the list of items and quantity of each item that is suggested for the size of the event. In other aspects, the online shopping cart webpage provided by the website computer 202 can include a suggested item section having suggested items for modifying the items in the cart (e.g., suggest blue paper plates and receive input to swap the red paper plates in the cart for the blue paper plates) by input received from the device 101; while in other aspects, no further interaction with the device 101 is needed. The displayed webpage can also include options, for selection by the device 101, to obtain the items, such as curbside pickup, in-store pickup, or delivery. In arrow "Confirm Cart and Options", the website computer 202 receives a message from the device 101 containing information that the items in the online shopping cart and method of pickup or delivery are confirmed (see description for FIG. 1 for discussion of options).

Unique to the disclosed method 200, there is no item-by-item search performed by the customer using device 101. Instead, the customer only answers inquiries to help the website computer 202 identify the event, and the burden of item search shifts to the website computer 202, which is programmed to determine the list of items associated with the identified/selected event and add the items to the online shopping cart. In aspects of this disclosure, no interaction is made between the website computer 202 and the device 101 of the customer between the steps of receiving the input for the size of the event and presenting the online shopping cart via the online shopping cart webpage. In further aspects, the online shopping cart displayed on the online shopping cart website is not populated with items by an item-by-item search using the device 101 via the merchant's e-commerce website.

In arrow "Request Payment Information", the website computer 202 can present the device 101 with a webpage that requests the customer to enter payment information, such as payment card number, payment card expiration date and any other information a merchant may request to verify and authorize payment for the items in the online shopping cart (e.g., zip code, phone number, payment card code, customer identification number, or a combination thereof). In arrow "Receive Payment Information", the website computer 202 receives any payment information sent from the device 101 to the website computer 202.

Upon receiving payment information from the device 101, arrow "Payment Request" indicates that the website computer 202 can send a payment request message to the payment provider 103. Arrow "Payment Request" between the payment provider 103 and the payment entities indicates that the payment provider 103 can then send a payment request message to the appropriate payment entity of the payment entities 104, for payment from the customer's payment account (associated with the payment card) to the merchant's account. Arrow "Payment Completion" between the payment entities 104 and the payment provider 103 indicates that the payment entity of the payment entities 104 then sends a payment completion message to the payment provider 103. Arrow "Payment Completion" that is between the payment provider 103 and the website computer 202 indicates that the payment provider 103 then sends a payment completion message to the website computer 202. In response to receiving the payment completion message from the payment provider 103, arrow "Order Completion Message" indicates that the website computer 202 then sends an order completion message (confirming payment) to the device 101, displayable as an order completion webpage on the device 101 for viewing by the customer.

Figure 3:
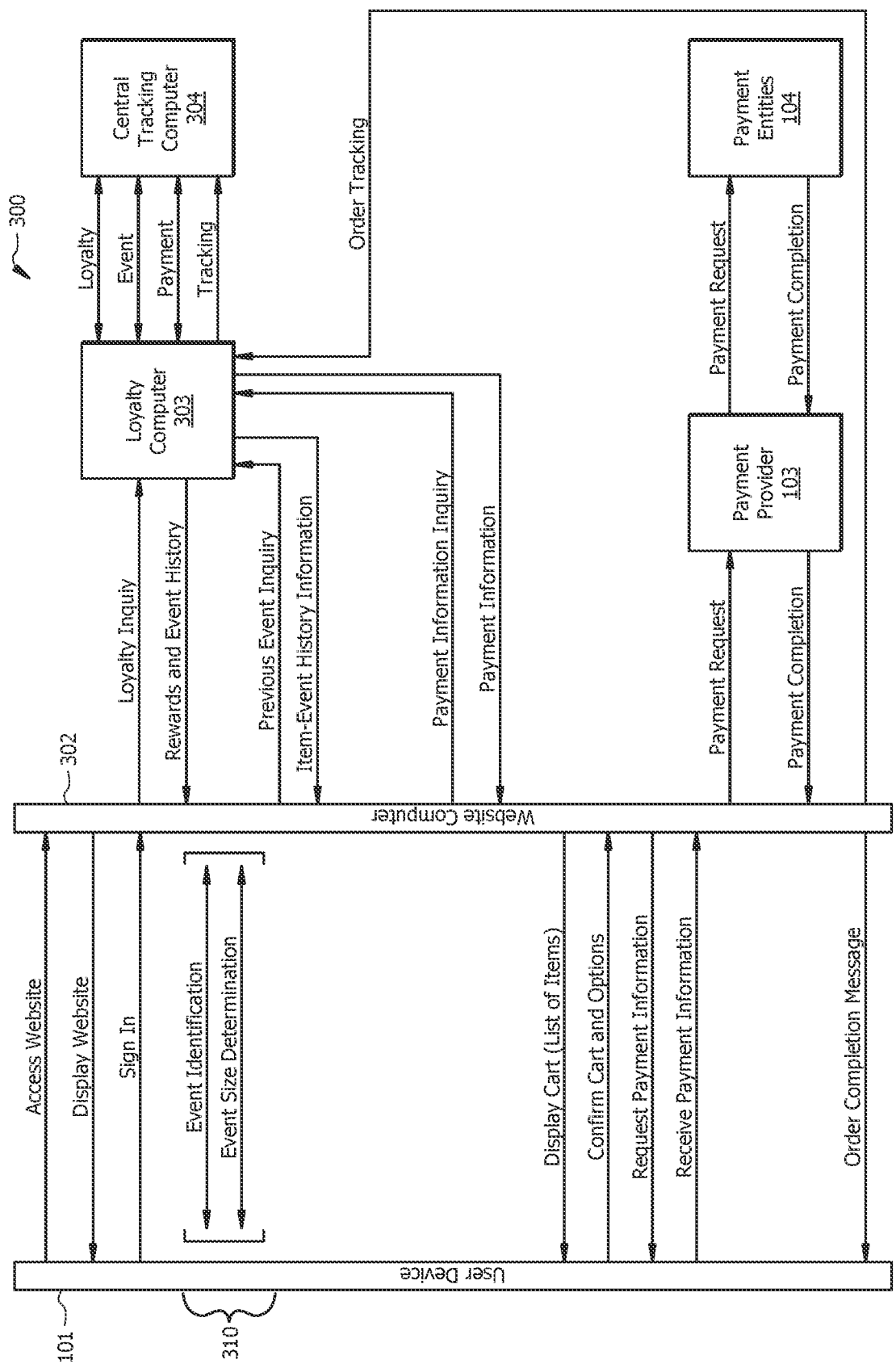
FIG. 3 is a schematic diagram of another embodiment of data flow and computer components used in e-commerce processing for an event-centric online shopping transaction.

The disclosed method 300 for processing an event-centric online shopping transaction is shown in FIG. 3. The event used to describe the method 300, when appropriate, is a single birthday party, and the size of the event is ten people.

The computer system components that have functionality to perform the method 300 include the device 101 of the customer, the website computer 302 of a merchant computer system, a loyalty computer 303 of the merchant computer system, a central tracking computer 304 of the merchant computer system, the payment provider 103, and the payment entities 104. The computer system components are linked or networked with at least one other component to accomplish the communications shown in FIG. 3: the device 101 is networked with the website computer 302; the website computer 302 is additionally networked with the loyalty computer 303 and with the payment provider 103; the loyalty computer 303 is additionally networked with the central tracking computer 304; and the payment provider 103 is additionally networked with the payment entities 104. The network between any two of the computer system components can be via a Wi-Fi communication network, a Bluetooth communication network, a cellular communication network, a mobile communication network, a satellite communication network, an Ethernet communication network, a wired communication network, or a combination thereof.

Each of the computer system components 103, 104, 302, 303, and 304 can be embodied with computer equipment such as one or more processors, memory, networking cards, and other equipment for processing data (e.g., sending/receiving messages containing data) associated with online shopping at a merchant's e-commerce website. Moreover, any combination of computer system components 103, 104, 302, 303, and 304 can be embodied in whole or in part as a cloud computing system.

The device 101 of the customer is configured to access the merchant's website via an Internet connection and allow the customer to provide input for online purchases of items at the merchant's website. The website computer 302 is configured to host the merchant's website and to communicate with the device 101, payment provider 103, and loyalty computer 303 as described herein. The website is configured as an online e-commerce shopping platform in which customers can access and interact, via the device 101, in order to purchase items normally purchased at a brick and mortar location for a merchant. The website computer 302 also has additional functionality described in more detail below. The loyalty computer 303 is configured to communicate with the central tracking computer 304 to reconcile whether a customer's loyalty information is associated with a loyalty account and if so, to determine the amount of available rewards (e.g., in the form a discount on the price of the purchase) for the customer. The loyalty computer 303 also has additional functionality described in more detail below. The central tracking computer 304 is configured for centralized tracking of customer purchases (both online and via brick and mortar locations) that are associated with the customer's loyalty account with the merchant and centralized tracking of any loyalty rewards (e.g., points, discounts, etc.) accumulated or redeemed by the customer with the merchant. The payment provider 103 is configured to provide payment processing for the merchant's website. The payment entities 104 are typical entities having equipment and payment networks for processing payment transactions (e.g., computer equipment of an acquiring bank, issuing bank, processing entity, a VISA® payment processing network, for example).

Labeled arrows are used to describe the method 300 in FIG. 3. The "Access Website" arrow indicates that the method 300 can begin with the user accessing the merchant's website via the device 101. Typically, the user types in the URL address of the merchant's website in an Internet browser (e.g., Chrome, Firefox, Internet Explorer, Safari, or any other browser), causing the device 101 to find the merchant's website on the Internet. The website computer 302 is configured to send a designated webpage for display (the "Display Website" arrow) of the designated webpage of the merchant's website on the device 101.

The method 300 can then include the customer signing into the website. Arrow "Sing In" indicates that the website computer 302 can be configured to receive customer login information (e.g., username, password) from the device 101. Upon receipt of the customer login information, the website computer 302 is configured to send a "Loyalty Inquiry" message to the loyalty computer 303. The loyalty inquiry message can include the username and/or password of the customer, and the loyalty computer 303 can include a datastore having customer loyalty login data so as to verify whether or not the customer login information is associated with an existing loyalty account. If the customer login information is associated with an existing loyalty account, the "Loyalty" double arrow indicates that the loyalty computer 303 can communicate with the central tracking computer 304 to determine the amount of available rewards (e.g., in the form a discount on the price of the fuel) that are associated with the customer at the time of login. The loyalty computer 303 then sends a "Rewards and Event History" message to the website computer 302. The "Rewards and Event History" message can contain information indicating 1) the customer login information is not associated with a loyalty account and there are no rewards available, or 2) the customer login information is associated with a loyalty account, a balance of rewards that are associated with the customer's loyalty account and available for use in the transaction, and any event history associated with the loyalty account.

In aspects where the customer login information is not associated with a loyalty account, the website computer 302 can be configured to function as the website computer 202 as previously described for step 210 in the method 200 of FIG. 2. In some aspects, the website computer 302 can send a "Login Failed" message to the device 101 before proceeding to webpages to initiate method step 210.

In aspects where the customer login information is associated with a loyalty account, the website computer 302 is configured to perform step 310 of method 300.

Step 310 indicates that the website computer 302 is configured to 1) communicate with the device 101 to i) identify the event that the customer is shopping for (the "Event Identification" double arrow), and ii) determine the size of the event (the "Event Size Determination" double arrow); and 2) communicate with the loyalty computer 303 to obtain event history and/or item-event history information (the "Previous Event Inquiry" and "Item-Event History Information" arrows).

In one aspect, the website computer 302 is configured to interact with the device 101 to identify the event and determine the size of the event for which the customer is shopping before communicating with the loyalty computer 303 for any item-event history information. In this aspect, the method 300 can include receiving, by the website computer 302, a search inquiry or selection for an event from the device 101. The search inquiry or selection can be via a webpage the is presented by the website computer 302 and can, in some embodiments, contain a list of events that are selectable by the device 101. The website computer 302 can be configured to then display a webpage inquiring how many people will attend the event, subsequently receiving an input from the device 101 for the number of people for the event. Alternatively, the website computer 302 can have an event landing webpage from which the website computer 302 can receive an event selection and optionally an input of the number of people attending the event from the device 101. In the example of the birthday party, the website computer 302 can receive a search inquiry, input, and/or selection from the landing page for a birthday party. Along with or separately from the inquiry, input, and/or selection, the website computer 302 can receive an input that 10 people will attend the birthday party. In additional embodiments of this aspect, the website computer 302 is configured to provide filtering inquiries to the device 101, either in individual webpages or in the event landing webpage, that are selectable to narrow the selected event to a particular event species. For example, for a birthday party, the website computer 302 can provide options to receive information from the device 101 to determine if the birthday party is for a baby, a toddler, a teenager, a young adult, a middle-aged adult, a senior citizen, a male, a female, gender neutral, allergy sensitivities (e.g., nut-free, gluten-free), color blind, deaf, blind, etc.

In this aspect, the website computer 302 can then send a "Previous Event Inquiry" message to the loyalty computer 303. The "Previous Event Inquiry" message contains the identified event for the event-centric online shopping transaction. Upon receipt of the "Previous Event Inquiry" message, the loyalty computer 303 can communicate with the central tracking computer 304 to obtain item-event history information containing a list of items previously purchased for a previous event that is the same as the selected event that the website computer 302 identified or received for the event-centric online shopping transaction. In some embodiments, the loyalty computer 303 can send a message to the central tracking computer 304 containing the identified event and a request for item-event history information containing a list of items previously purchased for a previous event that is the same as the selected event that the website computer 302 identified or received for the event-centric online shopping transaction.

The central tracking computer 304 is configured to store history information of items previously purchased with the loyalty account, i.e., the items previously purchased are associated with the loyalty account by the loyalty computer 303 or the central tracking computer 304 and then stored by the central tracking computer 304. The central tracking computer 304 in method 300 is additionally configured to store an event identification for each of the previously purchased items. Either the loyalty computer 303 or the central tracking computer 304 can associate items previously purchased with a previously identified event for tracking (and storage) by the central tracking computer 304. The item and associated event for each previously purchased item can be referred to herein as item-event history information.

Upon receipt of the item-event history information request from the loyalty computer 303, the central tracking computer 304 can access its datastore for the item-event history information and send a message to the loyalty computer 303 containing item-event history information containing a list of items previously purchased for a previous event that is the same as the selected event that the website computer 302 identified or received for the event-centric online shopping transaction.

In another aspect, the website computer 302 is configured to communicate with the loyalty computer 303 to obtain item-event history information that is associated with the loyalty account, before interacting with the device 101 to identify the event and determine the size of the event for which the customer is shopping. In this aspect, the website computer 302 can send the "Previous Event Inquiry" message to the loyalty computer 303. The "Previous Event Inquiry" message in this aspect does not contain an identified event for the event-centric online shopping transaction because the website computer 302 has not yet interacted with the device 101 to identify the event for the event-centric online shopping transaction. Instead, the "Previous Event Inquiry" message contains a request for the loyalty computer 303 to provide a list of all events previously identified in previous transactions associated with the loyalty account. Upon receipt of the "Previous Event Inquiry" message, the loyalty computer 303 can communicate with the central tracking computer 304 to obtain previous event history information containing a list of events previously identified in previous transactions. In some embodiments, the loyalty computer 303 can send a message to the central tracking computer 304 containing a list of all events previously identified in previous transactions associated with the loyalty account. Upon receipt of the previous event history information request from the loyalty computer 303, the central tracking computer 304 can access its datastore for the previous event history information and send a message to the loyalty computer 303 containing previous event history information containing a list of events previously identified for previous transactions associated with the loyalty account.

In this aspect, the "Event Identification" arrow includes that the website computer 302 is then configured to interact with the device 101 to identify the event and determine the size of the event for which the customer is shopping before communicating with the loyalty computer 303. In this aspect, the method 300 can include sending, by the website computer 302, a landing webpage containing a list (text list, thumbnails, or other visual identifier) of the previously identified event from the previous event history information and associated with the loyalty account, for display on the device 101. The website computer 302 can then receive from the device 101 a selection of one of the previously identified event(s). Alternatively, if a previously identified event is not suitable for selection (i.e., the customer wants a different event or a similar event of different species), the website computer 302 is configured to receive a search inquiry or input for an alternative event from the device 101. The "Event Size Determination" arrow indicates that the website computer 302 can be configured to then display a webpage inquiring how many people will attend the alternative event, subsequently receiving an input from the device 101 for the number of people for the event. In additional embodiments of this alternative embodiment, the website computer 302 is configured to provide filtering inquiries to the device 101, either in individual webpages or in the event landing webpage, that specify the species of the chosen event. For example, for a birthday party, the website computer 302 can provide options to receive information from the device 101 to determine if the birthday party is for a baby, a toddler, a teenager, a young adult, a middle-aged adult, a senior citizen, a male, a female, gender neutral, allergy sensitivities (e.g., nut-free, gluten-free), color blind, deaf, blind, etc.

After step 310, the website computer 302 is configured to determine a list of items that are associated with the event that has been identified and/or selected. In aspects, the datastore of, or networked with, the website computer 302 can be pre-loaded with item lists that associated with events. In additional aspects, the list of items contained in the online shopping cart can include at least some of the items previously purchased for the previous event. It is contemplated that a given item may be associated with more than one event; for example, utensils may be associated with any type of party having food; while other items may be unique for a specific event, such as new year's party favors for a New Year's Eve event. For the birthday example, the website computer 302 can be configured to determine that items associated with the birthday party include a birthday cake, candles, balloons, cups, plates, utensils, party hats, napkins, table covering, flowers, beverages, etc. In some aspects, the website computer 302 determines the list to contain i) items received in the item-event history information, ii) items that are unique to the selected event but are not based on item-event history information, iii) items based on any filtering criteria received from the device 101; or iv) any combination of i), ii), or iii).

Also after step 310, the website computer 302 can optionally be configured to communicate with the device 101 to communicate with the loyalty computer 303 to send a "Payment Information Inquiry" message to the loyalty computer 303. The loyalty computer 303 can retrieve any payment information associated with the loyalty account and then send a "Payment Information" message containing the payment information associated with the loyalty account to the website computer 302. The website computer 302 can receive the "Payment Info" message from the loyalty computer 303.

In the arrow "Display Cart (List of Items)", the website computer 302 can present the device 101 with a webpage that lists the items associated with the in the online shopping cart. The displayed online shopping cart webpage can include a button to adjust the suggested quantity for each item in the list. In some aspects, the online shopping cart webpage provided by the website computer 302 can include a button for each item that deletes the item from the online shopping cart, and the website computer 302 can receive a deletion of one or more items from the list from the device 101. In other aspects, the website computer 302 can receive a confirmation that there is no change to the list of items and quantity of each item that is suggested for the size of the event. The displayed webpage can also include options, for selection by the device 101, to obtain the items, such as curbside pickup, in-store pickup, or delivery. In arrow "Confirm Cart and Options", the website computer 302 receives a message from the device 101 containing information that the items in the online shopping cart and method of pickup or delivery are confirmed (see description for FIG. 1 for discussion of options).

Unique to the disclosed method 300, there is no item-by-item search performed by the customer using device 101. Instead, the customer only answers inquiries to help the website computer 302 identify the event, and the burden of item search shifts to the website computer 302, which is programmed to determine the list of items associated with the identified/selected event by utilizing loyalty information available by communication with the loyalty computer 303, and add the items to the online shopping cart. In aspects of this disclosure, no interaction is made between the website computer 302 and the device 101 of the customer between the steps of receiving the input for the size of the event and presenting the online shopping cart via the online shopping cart webpage. In further aspects, the online shopping cart displayed on the online shopping cart website is not populated with items by an item-by-item search using the device 101 via the merchant's e-commerce website.

In arrow "Request Payment Information", the website computer 302 can present the device 101 with a webpage that shows the payment information received from the loyalty computer 303 and requests the customer to confirm the payment information. The website computer 302 can also provide an option for the customer to enter via the device 101 new payment information such as payment card number, payment card expiration date and any other information a merchant may request to verify and authorize payment for the items in the online shopping cart (e.g., zip code, phone number, payment card code, customer identification number, or a combination thereof). In arrow "Receive Payment Information", the website computer 302 receives a confirmation of the payment information or any new payment information sent from the device 101 to the website computer 302.

Upon receiving the confirmation or new payment information from the device 101, arrow "Payment Request" indicates that the website computer 302 can send a payment request message to the payment provider 103. Arrow "Payment Request" between the payment provider 103 and the payment entities indicates that the payment provider 103 can then send a payment request message to the appropriate payment entity of the payment entities 104, for payment from the customer's payment account (associated with the payment card) to the merchant's account. Arrow "Payment Completion" between the payment entities 104 and the payment provider 103 indicates that the payment entity of the payment entities 104 then sends a payment completion message to the payment provider 103. Arrow "Payment Completion" that is between the payment provider 103 and the website computer 302 indicates that the payment provider 103 then sends a payment completion message to the website computer 302. In response to receiving the payment completion message from the payment provider 103, arrow "Order Completion Message" indicates that the website computer 302 then sends an order completion message (confirming payment) to the device 101, displayable as an order completion webpage on the device 101 for viewing by the customer.

In the method 300, the website computer 302 can be configured to send an "Order Tracking" message to the loyalty computer 303. Before sending the message, the website computer 302 can be configured to associate each item with the event of the transaction. The "Order Tracking Message" can contain i) the items purchased in the transaction, ii) an identification of the event, iii) a first association identifier for each item with the event, iv) a second association identifier for the items, the event, the first association, or a combination thereof with the loyalty account, or v) any combination of i), ii), iii), or iv). The loyalty computer 303 can be configured to send a "Tracking" message to the central tracking computer 304. The "Tracking" message can contain i) the items purchased in the transaction, ii) an identification of the event, iii) a first association identifier for each item with the event, iv) a second association identifier for the items, the event, the first association, or a combination thereof with the loyalty account, or v) any combination of i), ii), iii), or iv). The central tracking computer 304 can be configured to store i) the items purchased in the transaction, ii) an identification of the event, iii) a first association identifier for each item with the event, iv) a second association identifier for the items, the event, the first association, or a combination thereof with the loyalty account, or v) any combination of i), ii), iii), or iv), for subsequent retrieval in future transactions by the customer associated with the loyalty account.

Additional Description

Embodiment 1 is a method for processing an event-centric online shopping transaction via an e-commerce website, wherein the e-commerce website is administered by a website computer, and the method includes presenting, by the website computer to a device of a customer, a first webpage of the e-commerce website, wherein the first webpage contains a list of events; receiving, by the website computer from the device of the customer via the e-commerce website, a selection for an event from the list of events for the event-centric online shopping transaction; receiving, by the website computer from the device of the customer via the e-commerce website, an input for a size of the event; determining, by the website computer, a list of items that are associated with the event; determining, by the website computer, a quantity for each of the items based on the size of the event; and presenting, by the website computer via a second webpage, an online shopping cart containing the list of items and the quantity for each of the items for display on the device of the customer; wherein no interaction is made between the website computer and the device of the customer between the steps of receiving the input for the size of the event and presenting the online shopping cart via the second webpage.

Embodiment 2 is the method of Embodiment 1, wherein the online shopping cart is not populated with items via an item-by-item search by the device of the customer via the e-commerce website.

Embodiment 3 is the method of any of Embodiments 1 to 2, further comprising: receiving, by the website computer from the device of the customer, payment information for payment of items in the online shopping cart; requesting, by the website computer to a payment provider, a payment for items in the online shopping cart; receiving, by the website computer from the payment provider, a payment completion message; and sending, by the website computer to the device of the customer, an order completion message.

Embodiment 4 is the method of any of Embodiments 1 to 3, further comprising: associating, by the website computer, the event-centric online shopping transaction with a loyalty account of the customer.

Embodiment 5 is the method of Embodiment 4, further comprising: sending, by the website computer to a loyalty computer, a loyalty inquiry message containing customer login information; determining, by the loyalty computer, the customer login information is associated with the loyalty account; and receiving, by the website computer from the loyalty computer, a rewards and event history message containing a balance of rewards available for the event-centric online shopping transaction and optionally the event history associated with the loyalty account.

Embodiment 6 is the method of Embodiment 5, wherein the list of events presented on the first webpage contains at least a portion of the event history.

Embodiment 7 is the method of any of Embodiments 4 to 6, further comprising: sending, by the website computer to a loyalty computer, a previous event inquiry message; and receiving, by the website computer from the loyalty computer, item-event history information containing a list of previous items previously purchased for a previous event that is the same as or similar to the selection for the event; wherein the list of items contained in the online shopping cart includes at least some of the previous items previously purchased for the previous event.

Embodiment 8 is the method of any of Embodiments 4 to 7, further comprising: sending, by the website computer to a loyalty computer, a payment information inquiry message; and receiving, by the website computer from the loyalty computer, a payment information message containing payment information that is associated with the loyalty account; wherein the payment information is used by the website computer for payment of items in the online shopping cart.

Embodiment 9 is the method of any of Embodiments 4 to 8, further comprising: receiving, by the website computer from a payment provider, a payment completion message; and sending, by the website computer to a central tracking computer, an order tracking message containing i) items purchased in the event-centric online shopping transaction, ii) an identification of the event, iii) a first association identifier for each item with the event, iv) a second association identifier for the items purchased, the event, the first association identifier, or a combination thereof with the loyalty account, or v) any combination of i), ii), iii), or iv).

Embodiment 10 is the method of any of Embodiments 1 to 9, wherein a first time to complete an item-selection portion of the event-centric online shopping transaction is less than 60% of a second time to complete an item-selection portion of an item-centric online shopping transaction.

Embodiment 11 is the method of any of Embodiments 1 to 10, wherein the website computer is networked with the device of the customer via a cellular communication network, a mobile communication network, a satellite communication network, a wired communication network, or a combination thereof.

Embodiment 12 is an e-commerce system for processing an event-centric online shopping transaction, and the system can include a website computer configured to: administer an e-commerce website; present, to a device of a customer that is networked with the website computer, a first webpage of the e-commerce website, wherein the first webpage contains a list of events; receive, from the device of the customer via the e-commerce website, a selection for an event from the list of events for the event-centric online shopping transaction; receive, from the device of the customer via the e-commerce website, an input for a size of the event; determine a list of items that are associated with the event; determine a quantity for each of the items based on the size of the event; and present, via a second webpage, an online shopping cart containing the list of items and the quantity for each of the items for display on the device of the customer; wherein no interaction is made between the website computer and the device of the customer between the website computer receiving the input for the size of the event and presenting the online shopping cart via the second webpage.

Embodiment 13 is the system of Embodiment 12, wherein the online shopping cart is not populated with items via an item-by-item search by the device of the customer via the e-commerce website.

Embodiment 14 is the system of any of Embodiments 12 to 13, wherein the website computer is further configured to: receive, from the device of the customer, payment information for payment of items in the online shopping cart; request, to a payment provider, a payment for items in the online shopping cart; receive, from the payment provider, a payment completion message; and send, to the device of the customer, an order completion message.

Embodiment 15 is the system of any of Embodiments 12 to 14, wherein the website computer is further configured to: associate the event-centric online shopping transaction with a loyalty account of the customer.

Embodiment 16 is the system of Embodiment 15, further comprising: a loyalty computer networked with the website computer; wherein the website computer is further configured to: send, to the loyalty computer, a loyalty inquiry message containing customer login information; and receive, from the loyalty computer, a rewards and event history message containing a balance of rewards available for the event-centric online shopping transaction and optionally the event history associated with the loyalty account; wherein the loyalty computer is configured to: determine the customer login information is associated with the loyalty account; wherein the list of events presented on the first webpage contains at least a portion of the event history.

Embodiment 17 is the system of Embodiment 15, further comprising: a loyalty computer networked with the website computer; wherein the website computer is further configured to: send, to the loyalty computer, a previous event inquiry message; and receive, from the loyalty computer, item-event history information containing a list of previous items previously purchased for a previous event that is the same as or similar to the selection for the event; wherein the list of items contained in the online shopping cart includes at least some of the previous items previously purchased for the previous event.

Embodiment 18 is the system of Embodiment 15, further comprising: a loyalty computer networked with the website computer; wherein the website computer is further configured to: send, to the loyalty computer, a payment information inquiry message; and receive, from the loyalty computer, a payment information message containing payment information that is associated with the loyalty account; wherein the payment information is used by the website computer for payment of items in the online shopping cart.

Embodiment 19 is the system of any of Embodiments 12 to 18, further comprising: a central tracking computer networked with the website computer; wherein the website computer is further configured to: receive, from a payment provider, a payment completion message; and send, to the central tracking computer, an order tracking message containing i) items purchased in the event-centric online shopping transaction, ii) an identification of the event, iii) a first association identifier for each item with the event, iv) a second association identifier for the items purchased, the event, the first association identifier, or a combination thereof with the loyalty account, or v) any combination of i), ii), iii), or iv).

Embodiment 20 is the system of any of Embodiments 12 to 19, wherein a first time to complete an item-selection portion of the event-centric online shopping transaction is less than 60% of a second time to complete an item-selection portion of an item-centric online shopping transaction.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for processing an event-centric online shopping transaction via an e-commerce website, wherein the e-commerce website is administered by a website computer, the method comprising:
    presenting, by the website computer to a device of a customer, a first webpage of the e-commerce website, wherein the first webpage contains a list of events;
    receiving, by the website computer from the device of the customer via the e-commerce website, a selection for an event from the list of events for the event-centric online shopping transaction;
    receiving, by the website computer from the device of the customer via the e-commerce website, an input for a size of the event;
    determining, by the website computer, a list of items that are associated with the event;
    determining, by the website computer, a quantity for each of the items based on the size of the event; and
    automatically presenting, by the website computer via a second webpage, an online shopping cart containing the list of items and the quantity for each of the items for display on the device of the customer;
    wherein no interaction is made between the website computer and the device of the customer between the steps of receiving the input for the size of the event and automatically presenting the online shopping cart via the second webpage, and wherein the automatically presenting causes a more rapid transaction speed and a reduced data load on the website computer than another form of presentation of the online shopping cart containing the list of items and the quantity for each of the items.

2. The method of claim 1, wherein the online shopping cart is not populated with items via an item-by-item search by the device of the customer via the e-commerce website.

3. The method of claim 1, further comprising:
    receiving, by the website computer from the device of the customer, payment information for payment of items in the online shopping cart;
    requesting, by the website computer to a payment provider, a payment for items in the online shopping cart;
    receiving, by the website computer from the payment provider, a payment completion message; and
    sending, by the website computer to the device of the customer, an order completion message.

4. The method of claim 1, further comprising:
    associating, by the website computer, the event-centric online shopping transaction with a loyalty account of the customer.

5. The method of claim 4, further comprising:
    sending, by the website computer to a loyalty computer, a loyalty inquiry message containing customer login information;
    determining, by the loyalty computer, the customer login information is associated with the loyalty account; and
    receiving, by the website computer from the loyalty computer, a rewards and event history message containing a balance of rewards available for the event-centric online shopping transaction and optionally the event history associated with the loyalty account.

6. The method of claim 5, wherein the list of events presented on the first webpage contains at least a portion of the event history.

7. The method of claim 4, further comprising:
    sending, by the website computer to a loyalty computer, a previous event inquiry message; and
    receiving, by the website computer from the loyalty computer, item-event history information containing a list of previous items previously purchased for a previous event that is the same as or similar to the selection for the event;
    wherein the list of items contained in the online shopping cart includes at least some of the previous items previously purchased for the previous event.

8. The method of claim 4, further comprising:
    sending, by the website computer to a loyalty computer, a payment information inquiry message; and
    receiving, by the website computer from the loyalty computer, a payment information message containing payment information that is associated with the loyalty account;
    wherein the payment information is used by the website computer for payment of items in the online shopping cart.

9. The method of claim 4, further comprising:
    receiving, by the website computer from a payment provider, a payment completion message; and
    sending, by the website computer to a central tracking computer, an order tracking message containing i) items purchased in the event-centric online shopping transaction, ii) an identification of the event, iii) a first association identifier for each item with the event, iv) a second association identifier for the items purchased, the event, the first association identifier, or a combination thereof with the loyalty account, or v) any combination of i), ii), iii), or iv).

10. The method of claim 1, wherein a first time to complete an item-selection portion of the event-centric online shopping transaction is less than 60% of a second time to complete an item-selection portion of an item-centric online shopping transaction.

11. The method of claim 1, wherein the website computer is networked with the device of the customer via a cellular communication network, a mobile communication network, a satellite communication network, a wired communication network, or a combination thereof.

12. An e-commerce computing system for processing an event-centric online shopping transaction, comprising:
a website computer configured to:
   administer an e-commerce website;
   present, to a device of a customer that is networked with the website computer, a first webpage of the e-commerce website, wherein the first webpage contains a list of events;
   receive, from the device of the customer via the e-commerce website, a selection for an event from the list of events for the event-centric online shopping transaction;
   receive, from the device of the customer via the e-commerce website, an input for a size of the event;
   determine a list of items that are associated with the event;
   determine a quantity for each of the items based on the size of the event; and
   automatically present, via a second webpage, an online shopping cart containing the list of items and the quantity for each of the items for display on the device of the customer;
   wherein no interaction is made between the website computer and the device of the customer between the website computer receiving the input for the size of the event and automatically presenting the online shopping cart via the second webpage, and wherein the automatically presenting causes a more rapid transaction speed and a reduced data load on the e-commerce computing system than another form of presentation of the online shopping cart containing the list of items and the quantity for each of the items.

13. The computing system of claim 12, wherein the online shopping cart is not populated with items via an item-by-item search by the device of the customer via the e-commerce website.

14. The computing of claim 12, wherein the website computer is further configured to:
   receive, from the device of the customer, payment information for payment of items in the online shopping cart;
   request, to a payment provider, a payment for items in the online shopping cart;
   receive, from the payment provider, a payment completion message; and
   send, to the device of the customer, an order completion message.

15. The computer system of claim 12, wherein the website computer is further configured to:
   associate the event-centric online shopping transaction with a loyalty account of the customer.

16. The computer system of claim 15, further comprising:
a loyalty computer networked with the website computer;
wherein the website computer is further configured to:
   send, to the loyalty computer, a loyalty inquiry message containing customer login information; and
   receive, from the loyalty computer, a rewards and event history message containing a balance of rewards available for the event-centric online shopping transaction and optionally the event history associated with the loyalty account;
wherein the loyalty computer is configured to:
   determine the customer login information is associated with the loyalty account;
wherein the list of events presented on the first webpage contains at least a portion of the event history.

17. The computer system of claim 15, further comprising:
a loyalty computer networked with the website computer;
wherein the website computer is further configured to:
   send, to the loyalty computer, a previous event inquiry message; and
   receive, from the loyalty computer, item-event history information containing a list of previous items previously purchased for a previous event that is the same as or similar to the selection for the event;
wherein the list of items contained in the online shopping cart includes at least some of the previous items previously purchased for the previous event.

18. The computer system of claim 15, further comprising:
a loyalty computer networked with the website computer;
wherein the website computer is further configured to:
   send, to the loyalty computer, a payment information inquiry message; and
   receive, from the loyalty computer, a payment information message containing payment information that is associated with the loyalty account;
wherein the payment information is used by the website computer for payment of items in the online shopping cart.

19. The computer system of claim 15, further comprising:
a central tracking computer networked with the website computer;
wherein the website computer is further configured to:
   receive, from a payment provider, a payment completion message; and
   send, to the central tracking computer, an order tracking message containing i) items purchased in the event-centric online shopping transaction, ii) an identification of the event, iii) a first association identifier for each item with the event, iv) a second association identifier for the items purchased, the event, the first association identifier, or a combination thereof with the loyalty account, or v) any combination of i), ii), iii), or iv).

20. The computer system of claim 12, wherein a first time to complete an item-selection portion of the event-centric online shopping transaction is less than 60% of a second time to complete an item-selection portion of an item-centric online shopping transaction.

* * * * *